United States Patent [19]

Kawai et al.

[11] 4,125,390
[45] Nov. 14, 1978

[54] METHOD OF VACUUM-SEALING VACUUM ARTICLES

[75] Inventors: Masaru Kawai; Azusa Minamidani, both of Ise, Japan

[73] Assignee: Ise Electronics Corporation, Ise, Japan

[21] Appl. No.: 790,117

[22] Filed: Apr. 22, 1977

[30] Foreign Application Priority Data

Apr. 24, 1976 [JP]   Japan .................................. 51-46786

[51] Int. Cl.² ............................................ C03C 27/00
[52] U.S. Cl. .......................................... 65/34; 65/58; 65/59 A
[58] Field of Search ................. 65/34, 58, 59 R, 59 A

[56] References Cited

U.S. PATENT DOCUMENTS

| 2,259,165 | 10/1941 | Karasick | 65/34 X |
| 2,988,852 | 6/1961 | Henry | 65/34 |
| 3,220,097 | 11/1965 | Griest | 65/59 A X |

*Primary Examiner*—Arthur D. Kellogg
*Attorney, Agent, or Firm*—Townsend and Townsend

[57] ABSTRACT

A sealing member not adhesive before melting is applied to a portion of a vacuum article to be sealed while maintaining a communication passage between the inside and outside of the article. After mounting the article in an evacuation tank, the tank is evacuated to evacuate the article through the communication passage. Then the sealing member is heated and melted to seal the article airtightly.

4 Claims, 8 Drawing Figures

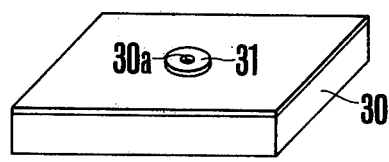
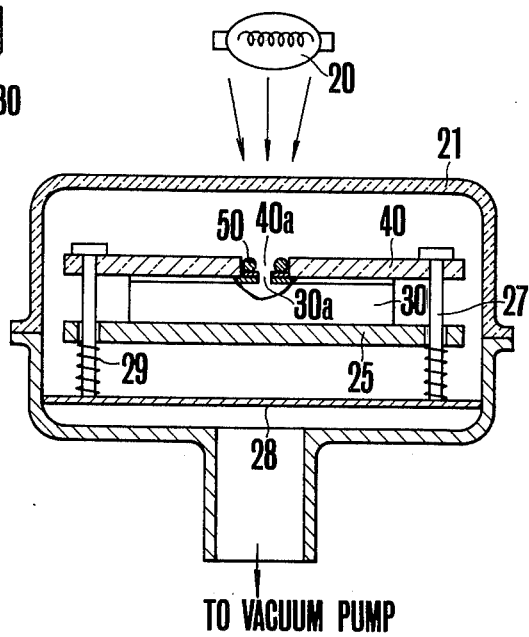
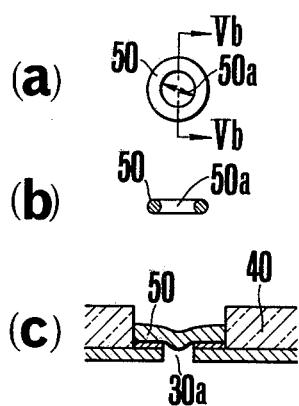
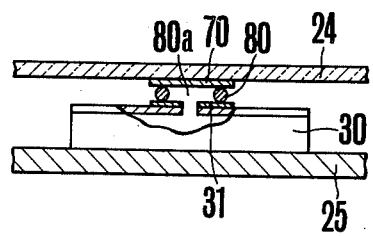
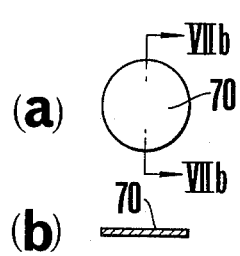
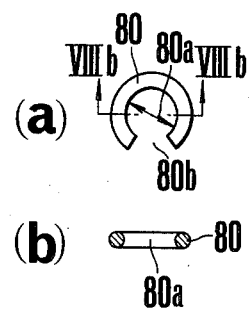

METHOD OF VACUUM-SEALING VACUUM ARTICLES

BACKGROUND OF THE INVENTION

This invention relates to a method of vacuum-sealing such vacuum articles as vacuum display tubes and the like.

Such a vacuum article is generally provided with an exhaust pipe for evacuating the article by connecting it with a vacuum pump. Such exhaust pipe, however, not only increases the dimension of the article but also decreases the degree of attainable vacuum due to low exhaust conductance caused by a comparatively long length of the pipe.

The exhaust pipe of a flat type vacuum display tube is connected to the flat substrate, spacer or boat shaped face glass plate of the tube by frit glass. After evacuation, the exhaust pipe is chipped off. Accordingly, the remaining portion of the exhaust pipe projects from the display tube thereby requiring an additional space for mounting the display tube. To decrease the space occupied by the exhaust pipe, it is necessary to decrease its diameter. Furthermore, as it is necessary for the exhaust pipe to have a definite length for connecting it to vacuum pump, the exhaust conductance is decreased. For this reason, the degree of vacuum in the vacuum display tube is much lower than the degree attainable by the evacuation pump.

SUMMARY OF THE INVENTION

It is therefore an object of this invention to provide an improved method of airtightly sealing a vacuum article without using any exhaust pipe thereby increasing the efficiency of evacuation and decreasing the manufacturing steps.

Another object of this invention is to provide a vacuum article having small size which can be manufactured at a lower cost than a similar article evacuated by using an exhaust pipe.

According to this invention, there is provided a method of vacuum-sealing a vacuum article comprising the steps of arranging a sealing member at a portion of the article to be airtightly sealed such that a communication passage is maintained between the inside and outside of the vacuum article, said sealing member having a property of not adhering to a surface to be sealed before it is melted, supporting the vacuum article in a evacuation tank, evacuating the evacuation tank and thereby evacuating the vacuum article through the communication passage, and heating and melting the sealing member so as to seal said portion thereby obtaining airtightly sealed vacuum article.

BRIEF DESCRIPTION OF THE DRAWINGS

In the accompanying drawings:

FIG. 3 is a perspective view showing another vacuum article to which the method of this invention is applicable;

FIG. 4 is a sectional view of one example of the apparatus utilized to vacuum-seal the vacuum article shown in FIG. 3;

FIG. 5a is a plan view of a sealing member utilized in the apparatus shown in FIG. 4;

FIG. 5b is a sectional view taken along a line V$b$–V$b$ shown in FIG. 5a;

FIG. 5c is a sectional view showing the manner of sealing a vacuum article by the sealing member shown in FIG. 5a;

FIG. 6 is a sectional view showing a modified method of sealing the vacuum article shown in FIG. 3;

FIG. 7a is a plan view of a plug for closing the exhaust opening utilized in the method shown in FIG. 6;

FIG. 7b is a sectional view of the plug shown in FIG. 7a taken along a line VII$b$–VII$b$;

FIG. 8a is a plan view of a sealing member utilized in the method shown in FIG. 6; and FIG. 8b is a sectional view of the sealing member shown in FIG. 8a taken along a line VIII$b$–VIII$b$.

DESCRIPTION OF THE PREFERRED EMBODIMENTS

Figure 1:
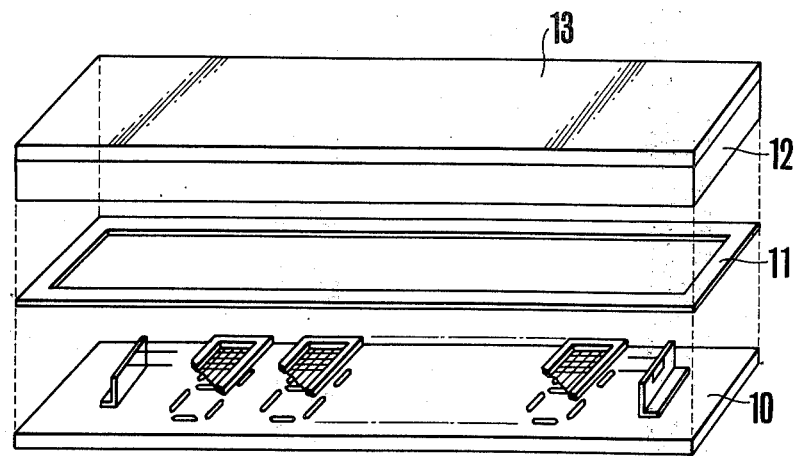
FIG. 1 is an exploded view of a vacuum display tube to which the method of this invention is applicable.

The vacuum article shown by way of a vacuum display tube in FIG. 1 to which the method of this invention is applicable comprises a flat substrate 10 made of such insulator as a glass sheet and anode electrodes, control electrodes and cathode electrode are mounted on the substrate 10 as diagrammatically illustrated. A rectangular spacer 12 and a face glass plate 13 are vacuum-sealed with frit glass or the like before assembling, so that the method of this invention is not applied to the vacuum seal of these elements. A sealing member 11 is interposed between the substrate 10 and the rectangular spacer 12 around the periphery of the substrate. The sealing member 11 is made of material that does not adhere, when not heat melted, to the portions of the vacuum article to be vacuum or airtightly sealed, that is the upper periphery of the substrate 10 and the lower surface of the spacer 12. For this reason, when the sealing member 11, the spacer 12 and the face glass plate 13 are stacked on the substrate 10 in the order mentioned, there are numerous air leakage paths between the sealing member 11 and the substrate 10 and between the sealing member 11 and the spacer 12. For this reason, as will be described later in more detail, the exhaust conductance is very large when the interior of the vacuum article constituted by the substrate 10, sealing member 11, spacer 12 and the face glass plate 13 is evacuated. The sealing member 11 is made of a low melting point alloy such as a solder either of Pb-Ag system or of Au-Ge system and shaped to coincide with the lower surface of the rectangular space 12.

Since vacuum articles are usually baked at a temperature of about 300° C. before vacuum-sealing for the purpose of degassing, the melting point of the sealing member should be higher than the baking temperature. Accordingly, it is advantagous to use a solder made of Pb-Ag system having a melting temperature of about 308° C. or of Au-Ge system having a melting temperature of about 340° C.

Figure 2:
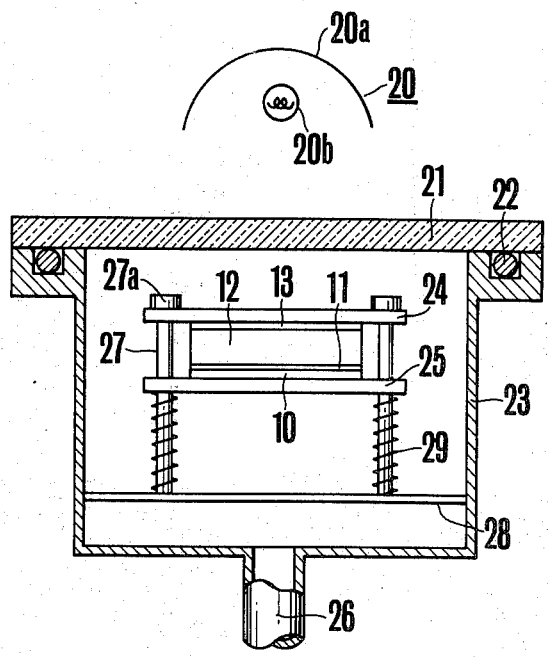
FIG. 2 is a sectional view of one example of the apparatus utilized to vacuum-seal the vacuum display tube shown in FIG. 1.

The vacuum display tube shown in FIG. 1 is vacuum-sealed by using apparatus shown in FIG. 2 which comprises a heat source 20 positioned outside a vacuum tank 23 for melting the sealing member of the vacuum display tube. The tank 23 is provided with a cover 21 made of a heat resistant transparent quartz glass plate, a packing 22 interposed between the glass plate 21 and the tank 23, a transparent clamping plate 24 for holding the vacuum display tube and made of alumina glass or quartz glass, and a support 25 which is made of ceramic or metal and utilized to support the vacuum display tube and to heat-shield lower structures. The tank 23 is connected to a vacuum pump, not shown, through an exhaust pipe 26.

The clamping glass plate 24 and the support 25 are supported by guide rods 27 extending through the four corners thereof and provided with heads 27a. The lower ends of the guide rods 27 are secured to a base 28 supported by tank 23. The clamping glass plate 24 is secured to the guide rods 27 but the support 25 can slide relative to the guide rods and is urged upwardly by coil springs 29 surrounding the guide rods. The heat source 20 comprises a reflector 20a of a suitable shape and a source of heating radiation 20b such as an infrared lamp or a halogen lamp. The radiation from the heating source 20b is projected upon the vacuum display tube through the cover 21 and the clamping glass plate 24 which transmit the radiation.

The method of vacuum-sealing utilizing the apparatus shown in FIG. 2 is as follows.

The spacer 12 and the face glass plate 13 are sealed beforehand with frit glass, for example. Then, the vacuum display tube is assembled by clamping the sealing member 11 between the substrate 10 and the spacer 12. After lowering the support 25, the assembly is inserted between the support 25 and the clamping plate 24. The interior of the tank 23 is evacuated to a desired degree of vacuum and then heat source 20 is operated to heat the sealing member 11 by the radiation from the source 20 thus melting the sealing member. As a consequence, the spacer is vacuum-sealed to the substrate.

Prior to the heating of the sealing member, the assembly of the vacuum display tube is clamped between the clamping glass plate 24 and the support 25 by the force of springs 28. There are numerous air leakage paths between the upper surface of the sealing member 11 and the lower surface of the spacer 12 and between the lower surface of the sealing member 11 and the upper surface of the substrate 10 so that the interior of the vacuum tank and of the assembly can be evacuated to substantially the same degree of vacuum at substantially the same speed. When the sealing member 11 is heat-melted, the support 25 is moved upwardly by the force of the springs thus providing an efficient vacuum seal.

It is advantageous to provide a thick peripheral metallic paste layer applied by printing technique or a metallized layer, not shown, so as to obtain good fusion of the sealing member to the surfaces to be sealed in an airtight manner. For example, where a Pb-Ag solder is used, a nickel film is vapour deposited.

Where the spacer and the substrate are made of ceramic, the ceramic is metallized and then plated with nickel. Where a process step which may cause oxidation of the nickel film at the sealing surface is to be used, before the evacuation step it is preferable to apply gold plating onto the nickel film.

Although in the foregoing embodiment the sealing member was clamped between the substrate and the spacer and then the spacer was heat-melted, it is also possible to interpose the sealing member between the spacer and the face glass plate. Alternatively, the spacer may be divided into two sections, one of which is sealed to the face glass plate and the other to the substrate by frit glass. Thereafter a sealing member is clamped and melted between the divided spacer sections.

FIG. 3 shows another example of a vacuum article that can be sealed by the method of this invention. The article shown in FIG. 3 comprises an exhaust opening 30a and a metal layer 31 formed about the exhaust opening by vacuum deposition of nickel. In the case of a ceramic substrate the metal layer 31 is formed by metallizing the ceramic substrate, and then plating nickel and gold. The vacuum article is hollow and vacuum-sealed by frit glass except the exhaust opening 30a.

To seal the article shown in FIG. 3, in an airtight manner, the article is mounted in a vacuum tank shown in FIG. 4 which is similar to that shown in FIG. 2. In this embodiment, an annular shaped sealing member 50 comprising a Pb-Ag solder is placed on the metal layer 31 around the exhaust opening 30a. An opening 40a is formed through the clamping plate 40 and the sealing member 50 is placed through this opening on the vacuum article 30 which is clamped between a support 25 and a clamping plate 40 which may or may not be transparent. The heat source 20 is mounted on the outside of tank 21 to oppose opening 40a.

Different from the first embodiment, in this embodiment, since a small sealing member is inserted in the opening 40a to sit on the metal layer 31, it is not efficient to evacuate the interior of the vacuum article by utilizing the air leakage paths between the metal layer and the sealing member. For this reason, in this embodiment the inner diameter 50a of the sealing member 50 is formed slightly larger than the diameter of the exhaust opening 30a, as shown in FIGS. 5a and 5b so as to communicate the interior of the vacuum article with the outside through these openings. With this construction the exhaust conductance can be improved because it is only necessary to provide exhaust opening 30a for the vacuum article and not necessary to mount a long exhaust pipe as in the prior art.

In the same manner as above described, during the baking step the tank is evacuated at a temperature below the melting point of the sealing member and upon reaching a desired vacuum, the temperature is increased to a temperature higher than the melting point of the sealing member to heat-melt the same. Then, the sealing member seals the exhaust opening in a manner as shown in FIG. 5c.

Where a nickel layer is used as the metal layer 31, the metal layer may be vapour deposited immediately prior to the evacuation step whereas when a ceramic substrate is used, the substrate is metallized by plating nickel and then a gold film is formed by plating for the purpose of preventing oxidation during the manufacturing steps. The sealing is effected by the fusion between the nickel or gold film and the solder.

In an embodiment shown in FIG. 6, a ring shaped sealing member 80 having an inner diameter 80a larger than the inner diameter of the exhaust opening 30a of the vacuum article 30 and having a notch 80b is placed on the metal layer 31 and a metal plate 70 is placed on the sealing member 80. Then the assembly is clamped by the transparent clamping plate 24. As shown in FIGS. 7a and 7b the metal plate 70 has an outer diameter larger than the diameter of the metal layer 31 and is made of metal having the same thermal expansion coefficient as the substrate, namely No. 426 alloy when the substrate is made of glass and, alternatively, Kovar when the substrate is made of alumina ceramic. The notch 80b of the sealing member 80 provides communication between the inside and outside of the vacuum article. Instead of providing the heat source on the outside of the vacuum tank, it can be installed within the tank. However, the latter arrangement complicates the construction.

As above described, according to this invention, it is possible to eliminate the exhaust pipe so that it is possible to reduce the size not only of the vacuum article but also a device utilizing the same. Absence of the exhaust pipe can also improve the evacuation conductance and decrease the evacuation time. Furthermore, it is possible to increase the degree of the vacuum in the vacuum article to substantially the same degree attainable in the vacuum tank. Furthermore, it is not necessary to mount the exhaust pipe on the vacuum article and to chip off the exhaust pipe after evacuation. Accordingly, the manufacturing step and the labour can be reduced.

What is claimed is:

1. A method of vacuum-sealing a vacuum article having an exhaust opening formed therein comprising the steps of:
   supporting said vacuum article on a support in an evacuation tank;
   clamping said vacuum article to said support with a conductive clamping plate having an opening therein, said clamping plate opening and said exhaust opening being aligned;
   placing a ring-shaped sealing member in said clamping plate opening, said sealing member having a lower melting point than that of said vacuum article and a property of not adhering to a surface to be sealed before it is melted;
   evacuating said evacuation tank thereby evacuating said vacuum article through said exhaust opening; and
   heating and melting said sealing member from a relatively low temperature heat source disposed exteriorly of said evacuation tank so as to seal said exhaust opening thereby obtaining an air-tightly sealed vacuum article.

2. The method of claim 1 further including the step of biasing said support toward said clamping plate by spring means.

3. A method of vacuum-sealing a vacuum article having an exhaust opening formed therein comprising the steps of:
   supporting said vacuum article on a support in an evacuation tank;
   placing a notched ring-shaped sealing member on said vacuum article, said sealing member being disposed about said exhaust opening;
   placing a metal plate on said sealing member to form an assembly;
   clamping said assembly to said support with a conductive clamping plate;
   evacuating said evacuation tank thereby evacuating said vacuum article through said exhaust opening; and
   heating and melting said sealing member from a relatively low temperature heat source disposed exteriorly of said evacuation tank so as to seal said exhaust opening thereby obtaining an air-tightly sealed vacuum article.

4. The method of claim 3 further including the step of biasing said support toward said clamping plate by spring means.

* * * * *